(12) United States Patent
Bringuier et al.

(10) Patent No.: US 11,650,387 B2
(45) Date of Patent: May 16, 2023

(54) FOAM FOR OPTICAL FIBER CABLE, COMPOSITION, AND METHOD OF MANUFACTURING

(71) Applicant: Corning Research & Development Corporation, Corning, NY (US)

(72) Inventors: Anne Germaine Bringuier, Taylorsville, NC (US); Xiaole Cheng, Painted Post, NY (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 0 days.

(21) Appl. No.: 17/729,359

(22) Filed: Apr. 26, 2022

(65) Prior Publication Data

US 2022/0252807 A1 Aug. 11, 2022

Related U.S. Application Data

(62) Division of application No. 16/918,466, filed on Jul. 1, 2020, now Pat. No. 11,327,260.
(Continued)

(51) Int. Cl.
*G02B 6/44* (2006.01)
*C08J 9/40* (2006.01)
(Continued)

(52) U.S. Cl.
CPC ............... *G02B 6/443* (2013.01); *B32B 5/18* (2013.01); *G02B 6/3888* (2021.05);
(Continued)

(58) Field of Classification Search
CPC ...................................................... C08J 9/405
See application file for complete search history.

(56) References Cited

U.S. PATENT DOCUMENTS 6,226,431 B1   5/2001 Brown et al.
6,463,199 B1  10/2002 Quinn et al.
(Continued)

FOREIGN PATENT DOCUMENTS

BR    PI0710002 A2   8/2011
CA      2842597 A1   9/2007
(Continued)

OTHER PUBLICATIONS

European Patent Application No. 20183755 Search Report and Search Opinion dated Feb. 1, 2021; 11 Pages; European Patent Office.
(Continued)

*Primary Examiner* — Charlie Y Peng
(74) *Attorney, Agent, or Firm* — William D. Doyle

(57) ABSTRACT

Embodiments of the disclosure relate to an optical fiber cable having at least one optical fiber, a cable jacket and a foam layer. The cable jacket includes an inner surface and an outer surface in which the outer surface is an outermost surface of the optical fiber cable. The inner surface is disposed around the at least one optical fiber. The foam layer is disposed between the at least one optical fiber and the cable jacket. The foam layer is made of an extruded product of at least one thermoplastic elastomer (TPE), a chemical foaming agent, and a crosslinking agent. The foam layer has a closed-cell morphology having pores with an average effective circle diameter of less than 100 μm. Further, the foam layer has a compression modulus of less than 1 MPa when measured at 50% strain.

5 Claims, 5 Drawing Sheets

Related U.S. Application Data

(60) Provisional application No. 62/869,929, filed on Jul. 2, 2019.

(51) Int. Cl.
  *B32B 5/18* (2006.01)
  *G02B 6/38* (2006.01)

(52) U.S. Cl.
  CPC ........... *G02B 6/3889* (2013.01); *G02B 6/448* (2013.01); *G02B 6/4434* (2013.01); *G02B 6/4486* (2013.01); *B32B 2305/022* (2013.01); *B32B 2323/046* (2013.01); *B32B 2457/00* (2013.01); *C08J 9/405* (2013.01)

(56) References Cited

U.S. PATENT DOCUMENTS

| | | | |
|---|---|---|---|
| 6,749,446 | B2 | 6/2004 | Nechitailo |
| 9,195,019 | B1 | 11/2015 | Parris et al. |
| 2010/0092139 | A1 | 4/2010 | Overton |
| 2010/0092140 | A1 | 4/2010 | Overton |
| 2011/0309541 | A1* | 12/2011 | Thompson ............. A61L 27/18 623/8 |
| 2016/0215130 | A1 | 7/2016 | Esseghir et al. |
| 2017/0276891 | A1 | 9/2017 | Esseghir et al. |

FOREIGN PATENT DOCUMENTS

| | | |
|---|---|---|
| CA | 2621004 A1 | 8/2008 |
| CN | 207817266 U | 9/2018 |
| JP | 2000-106041 A | 4/2000 |
| WO | 2020/215052 A1 | 10/2020 |

OTHER PUBLICATIONS

Extended Partial European Search Report and Search Opinion; 20183755.6 dated Oct. 22, 2020; 13 Pages; European Patent Office.

* cited by examiner

FOAM FOR OPTICAL FIBER CABLE, COMPOSITION, AND METHOD OF MANUFACTURING

CROSS-REFERENCED TO RELATED APPLICATIONS

This application is a Divisional of U.S. patent application Ser. No. 16/918,466 filed Jul. 1, 2020, which claims the benefit of priority under 35 U.S.C. § 119 of U.S. Provisional Application Ser. No. 62/869,929 filed on Jul. 2, 2019, the content of which is relied upon and incorporated herein by reference in its entirety.

BACKGROUND

The present invention is related to an optical fiber cable having a foam layer disposed between a ribbon stack and a cable jacket and, in particular, to polymer blend and method of forming the foam layer. Optical fiber cables incorporate a variety of materials with function-specific properties in multiple layers to achieve desired performance. For examples, the cable jacket and buffer tubes are often made of polyolefin materials. The optical fiber cable may also include a metal armor layer and one or more glass-reinforced plastic strength members. Though the polyolefins often provide good flexibility, the armor layer and/or strength members may create signal attenuation when the cable is bent, coiled, crushed, or twisted.

SUMMARY

In one aspect, embodiments of the present disclosure relate to an optical fiber cable having at least one optical fiber, a cable jacket and a foam layer. The cable jacket includes an inner surface and an outer surface in which the outer surface is an outermost surface of the optical fiber cable. The inner surface is disposed around the at least one optical fiber. The foam layer is disposed between the at least one optical fiber and the cable jacket. The foam layer is made of an extruded product of at least one thermoplastic elastomer (TPE), a chemical foaming agent, and a crosslinking agent. The foam layer has a closed-cell morphology having pores with an average effective circle diameter of less than 100 µm. Further, the foam layer has a compression modulus of less than 1 MPa when measured at 50% strain.

In another aspect, embodiments of the present disclosure relate to a method of preparing an optical fiber cable. In the method, a thermoplastic elastomer (TPE) blend is prepared that includes 100 parts of a polymer component, 0.1 to 3 parts of a chemical foaming agent, and 0.1 to 2 parts of a crosslinking agent. The TPE has a tensile modulus of at most 10 MPa at 100% secant. In the method, the TPE blend is extruded around an optical fiber cable core in a manner that produces a foam layer surrounding the optical fiber cable core along a longitudinal axis of the optical fiber cable core.

In yet another aspect, embodiments of the present disclosure relate to a thermoplastic elastomer (TPE) foam. The TPE foam includes an extruded product of 100 parts by weight of a polymer component including at least one TPE, 0.1 to 3 parts by weight of a chemical foaming agent, and 0.1 to 2 parts by weight of a crosslinking agent. The TPE foam has a closed-cell morphology having pores with an average effective circle diameter of less than 100 µm. The TPE foam has a compression modulus of less than 1 MPa at 50% strain, and the TPE foam has a compression set of no more than 5% as measured after compression to a strain of 60% for ten hours and after four hours of recovery time.

Additional features and advantages will be set forth in the detailed description that follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain principles and the operation of the various embodiments.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION

Referring generally to the figures, embodiments of the present disclosure relate to a thermoplastic foam that can be extruded around one or more ribbon stacks and/or buffer tubes of an optical fiber cable. The foam is formed from the extruded product of a blend of thermoplastic elastomer (TPE), a chemical foaming agent, and a crosslinking agent. By using a chemical foaming process, the chemical foaming agent advantageously can be compounded with the TPE and extruded within or around a cable core without the need for any special processing equipment. That is, because the foaming action takes place chemically, no equipment modifications are necessary to physically create the foam. Further, as compared to physical foams, the foams prepared according to embodiments of the present disclosure have similar density reductions (e.g., at least 65%) with better compression set performance, at least in part because the chemical foaming agent produces smaller pores than physical foaming agents. In an optical fiber cable, the foam provides cushioning for the optical fibers within the buffer tube(s). That is, the foam helps prevent attenuation of the optical fibers when the cable is bent, crushed, twisted, flexed, etc. In particular, the foam, which has a low modulus, diminishes the transmission of outside stress forces to the ribbon stack, which could otherwise cause fiber attenuation.

Further, in armored cable designs, the foam prevents attenuation issues caused by armor contact during cable bending, flexing, or coiling. Additionally, the foam allows for the reduction of the wall thickness of the buffer tubes and of the cable jacket so as to allow for increased fiber density within a given cable outside diameter. In this way, the foam also allows for significantly improved cable designs along with cost reduction through elimination of free space in the tubes, reduction of cable outer diameter, and use of smaller strength members (such as glass-reinforced plastic rods). As will be discussed more fully below, the TPE foam is extruded around a central buffer tube, a ribbon stack, or stranded buffer tubes in a manner that causes it to foam. These and other advantages and aspects of the foam will be discussed in relation to the embodiments disclosed and depicted herein, especially as they relate to an optical fiber cable. However, these embodiments are exemplary in nature, not limiting.

Figure 1:
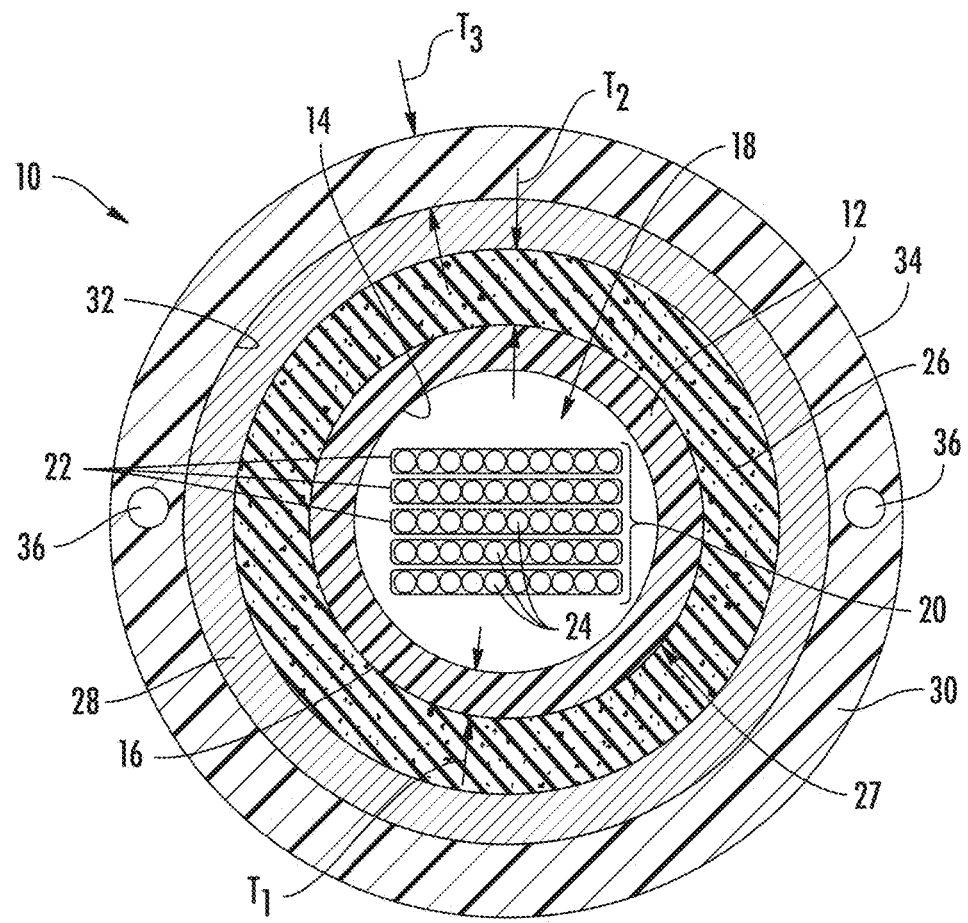
FIG. 1 is longitudinal, cross-sectional view of an optical fiber cable having a foam layer, according to an exemplary embodiment.

FIG. 1 depicts a longitudinal, cross-sectional view of an optical fiber cable 10. The optical fiber cable 10 includes at least one buffer tube 12, shown as a central tube. The buffer tube 12 has an inner surface 14 and an outer surface 16 that define an average buffer tube thickness $T_1$. In embodiments, the thickness $T_1$ of the buffer tube 12 is from 0.25 mm to 0.30 mm. The inner surface 14 defines a central bore 18 that extends along the longitudinal axis of the optical fiber cable 10 for at least a portion of the length of the optical fiber cable 10. Disposed within the central bore 18 of the buffer tube 12 is a stack 20 of optical fiber ribbons 22. The optical fiber ribbons 22 include a plurality of optical fibers 24 arranged in substantially planar arrays. In embodiments, the optical fibers 24 may be held in the array via a binding matrix and at least one coating of a curable resin.

Surrounding the buffer tube 12 along the longitudinal axis is a foam layer 26. As used herein, each element inside the foam layer 26 will be collectively referred to as an "optical fiber cable core" 27. Thus, in the embodiment of FIG. 1, the optical fiber cable core 27 includes the stack 20 of optical fiber ribbons 22 and the buffer tube 12. In embodiments, the foam layer 26 is extruded and drawn over the outer surface 16 of the buffer tube 12. Further, in embodiments, the foam layer 26 has a thickness $T_2$ of from 0.5 mm to 3 mm. In other embodiments, the foam layer 26 has an average thickness $T_2$ of from 0.5 mm to 2 mm, and in still other embodiments, the foam layer 26 has a thickness $T_2$ of from 1 mm to 2 mm.

Optionally, in embodiments, the optical fiber cable 10 includes an armor layer 28 disposed around the foam layer 26. In embodiments, the armor layer 28 is formed from a metal tape that is wrapped around the cable core 27. In certain embodiments, the armor layer 28 is corrugated. A cable jacket 30 surrounds the armor layer 28 (if provided) or the foam layer 26 (if no armor layer 28 is provided). The cable jacket 30 has an inner surface 32 and an outer surface 34 that define an average jacket thickness $T_3$. In embodiments, the cable jacket 30 has a thickness $T_3$ of from 1.25 mm to 1.75 mm. In embodiments, the cable jacket 30 has a thickness $T_3$ of about 1.50 mm. In embodiments, the outer surface 34 of the cable jacket 30 defines the outermost surface of the optical fiber cable 10. As depicted in FIG. 1, the optical fiber cable 10 may include strength elements 36 embedded in the cable jacket 30 between the inner surface 32 and the outer surface 34. Exemplary strength elements 36 include glass-reinforced plastic (GRP) rods and metal wire. In embodiments, the thickness $T_3$ is limited on the low end of the thickness $T_3$ range by the size of the strength elements 36.

Figure 2:
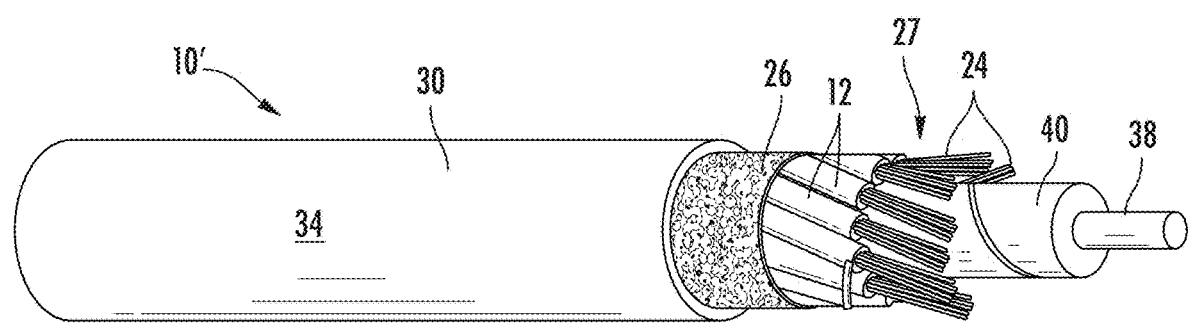
FIG. 2 is a perspective view of a portion of an optical fiber cable having a foam layer, according to an exemplary embodiment.

In another embodiment shown in FIG. 2, the optical fiber cable 10' includes a plurality of buffer tubes 12 stranded around a central strength member 38 having a coating 40. The buffer tubes 12 contain a plurality of optical fibers 24 in a loose tube configuration. The buffer tubes 12 are stranded around the coated central strength member 38, e.g., in a helical or SZ-stranded manner. Thus, in this embodiment of the optical fiber cable 10', the cable core 27 includes the plurality of buffer tubes 12, the optical fibers 24, the central strength member 38, and the coating 40. Surrounding the cable core 27 is the foam layer 26, and disposed around the foam layer 26 is the cable jacket 30.

Figure 3:
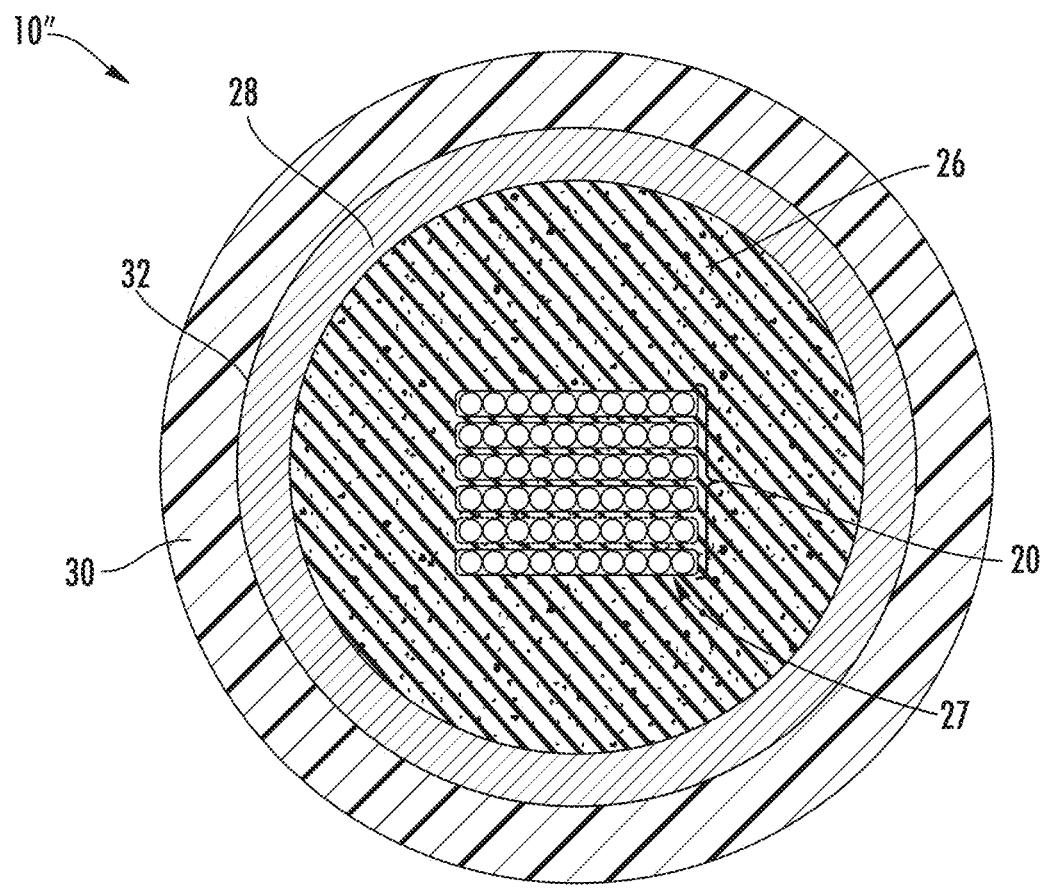
FIG. 3 is longitudinal, cross-sectional view of a portion of an optical fiber cable having a foam layer, according to an exemplary embodiment.

In a further embodiment of an optical fiber cable 10" depicted in FIG. 3, the foam layer 26 surrounds the ribbon stack 20. In the embodiment depicted, the buffer tube 12 is excluded (in which case the cable core 27 of the embodiment depicted includes just the ribbon stack 20). However, in other embodiments, a buffer tube 12 may surround the foam layer 26, and another foam layer 26 could surround the buffer tube 12 (in which case the cable core 27 includes the ribbon stack 20, the first foam layer 26, and the buffer tube 12). In the embodiment depicted, the foam layer 26 is surrounded by an optional armor layer 28, which is surrounded by the cable jacket 30. Thus, in the embodiment of FIG. 3, the foam layer 26 is in contact with the outer surface of the ribbon stack 24 and with the inner surface of the armor layer 28. However, in other embodiments, the foam layer 26 can be in contact with the outer surface of the ribbon stack 24 and with the inner surface 14 of a buffer tube 12 or with the inner surface 32 of the cable jacket 30.

Having described three embodiments of the optical fiber cables 10, 10', 10" in which the foam layer 26 may be incorporated, the foam layer 26 will now be described in greater detail. As mentioned above, the foam layer 26 is a TPE foam formed through a chemical foaming process.

In embodiments, the foam layer 26 primarily comprises a polymer component, a chemical foaming agent, and a cross-linking agent. In embodiments, the foam layer 26 comprises 0.1 to 3 parts of active chemical foaming agent and 0.1 to 2 parts of the active crosslinking agent per 100 parts of the polymer component.

In embodiments, the polymer component is primarily comprised of one or more TPE. In embodiments, the polymer component comprises at least 90% by weight of the one or more TPE. In embodiments, the polymer component may also comprise up to 10% by weight of low density polyethylene (LDPE).

A variety of TPE are suitable for use in the polymer component of the foam layer 26. In embodiments, the TPE comprises at least one of a polyolefin elastomer (POE), a thermoplastic polyolefin (TPO), or a thermoplastic vulcanizate (TPV). In an exemplary embodiment, the TPE is selected to have an unfoamed tensile modulus of at most 10 MPa at 100% secant according to ASTM D638. In other embodiments, the TPE is selected to have an unfoamed tensile modulus of at most 5 MPa at 100% secant according to ASTM D638.

In exemplary embodiments, suitable POE for the foam layer 26 include copolymers of ethylene and octene or butene, such as an ethylene-octene copolymer or an ethylene-butene copolymer. Such copolymers offer a low modulus at low temperature and high recovery from mechanical deformations. Two commercially available ethylene-octene copolymers include the Engage™ copolymer family and Infuse™ Olefin Block Copolymers (OBCs). Commercially available examples of TPOs include Catalloy TPOs of Softell grades (LyondellBasell Industries, Houston, Tex.), and commercially available examples of TPVs include Santoprene™ (Exxon Mobil Corporation, Irving, Tex.), and Sarlink® 8145 (Teknor Apex, Pawtucket, R.I.).

In embodiments, the chemical foaming agent comprises at least one of azodicarbonamide, azodiisobutyronitrile, benzenesulfohydrazide, 4,4-oxybenzenesulfonyl semicarbazide, para-toluene sulfonyl semicarbazide, barium azodicarboxylate, N,N'-dimethyl-N,N'-dinitrosoterephthalamide, trihydrazino triazine, or sodium bicarbonate. In embodiments, the chemical foaming agent is introduced to the foam layer 26 via a masterbatch, which provides for ease of handling. Commercially available examples of chemical foaming agents include Foamazol™ (Bergen International, LLC, East Rutherford, N.J.), Hydrocerol® (Clariant, Muttenz, Switzerland), Safoam® (Reedy Chemical Foam & Specialty Additives, Charlotte, N.C.), or similar chemical foaming agents.

In embodiments, the crosslinking agent comprises a peroxide. In particular embodiments, the peroxide comprises at least one of dicumyl peroxide, di-tert-butyl peroxide, ditertiary amyl peroxide, tert-butyl peroxide, tert-butyl cumyl peroxide, dibenzoyl peroxide, or tert-butyl hydroperoxide. Masterbatch of crosslinking agent is also preferred for the ease of handling. Commercially available examples include Luperox® (Arkema S.A., Colombes, France) and PCL (Polyvel Inc., Hammonton, N.J.). The crosslinking agent is used to produce free radicals during melt extrusion and induce partial crosslinks in the TPE. The partially crosslinked TPE has an increased melt strength so that the foam cell coalescence is minimized during foaming and density reduction is increased.

In embodiments, the foam layer 26 is formed by extruding the TPE blend around the cable core 27. Advantageously, the TPE blend can be prepared by simply mixing the polymer component, the chemical foaming agent, and the crosslinking agent in an extruder. In particular embodiments, the polymer component, the chemical foaming agent, and the crosslinking agent are dry-mixed prior to adding them into the extruder hopper. Other additives may also be added to the TPE blend in the extruder, including nucleating agents, processing aids, UV stabilizers, and/or antioxidants, among others. Successful extrusion of the TPE blend as a foam is achieved by adjusting the temperature and pressure profiles within the extruder to efficiently use the chemical foaming agent. During extrusion, the temperature at the feed zone is kept low enough to prevent premature decomposition of chemical foaming agents in the barrel while still allowing a melt seal to form (otherwise gas loss may occur back through the hopper). The melt zone temperature should then increase rapidly to above the decomposition temperature of the chemical foaming agent(s) and at the same time initiate the peroxide decomposition. Sufficient pressure is maintained on the melt to prevent foaming in the extruder. In embodiments, the pressure is maintained by use of a high compression screw or temperature reduction after the melting zone of the extruder. The pressure is maintained until the TPE blend exits the die at which point the rapid pressure drop initiates nucleation and foaming of the TPE blend. The TPE blend melt temperature at this point is kept as low as possible so that cooling can take place quickly to control expansion and limit escape of the gas. In embodiments, the temperature is kept lower than that for unfoamed plastics to enhance surface appearance.

In the TPE blend, the TPE provides the elastomeric property to the foam while the crosslinking agent provides a high expansion ratio as a result of high melt strength that results from the crosslinking. During foam extrusion, if the melt strength of the blend is too low, the bubbles will rupture and coalesce before the foam is cooled and a poor quality foam with large bubbles will result. Additionally, the blend may include one or more additives that prevent bubbles from coalescing and that improve stability, such as glycerol monostearate (GMS).

Figure 4:
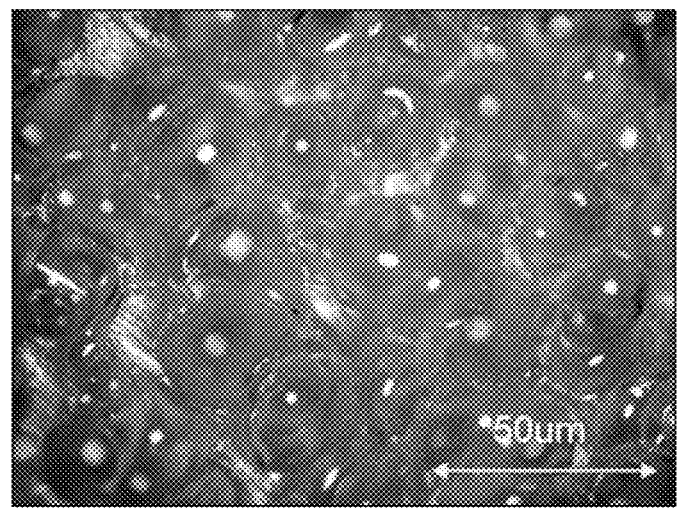
FIG. 4 is a micrograph of a TPE foam, according to an exemplary embodiment.
Figure 5:
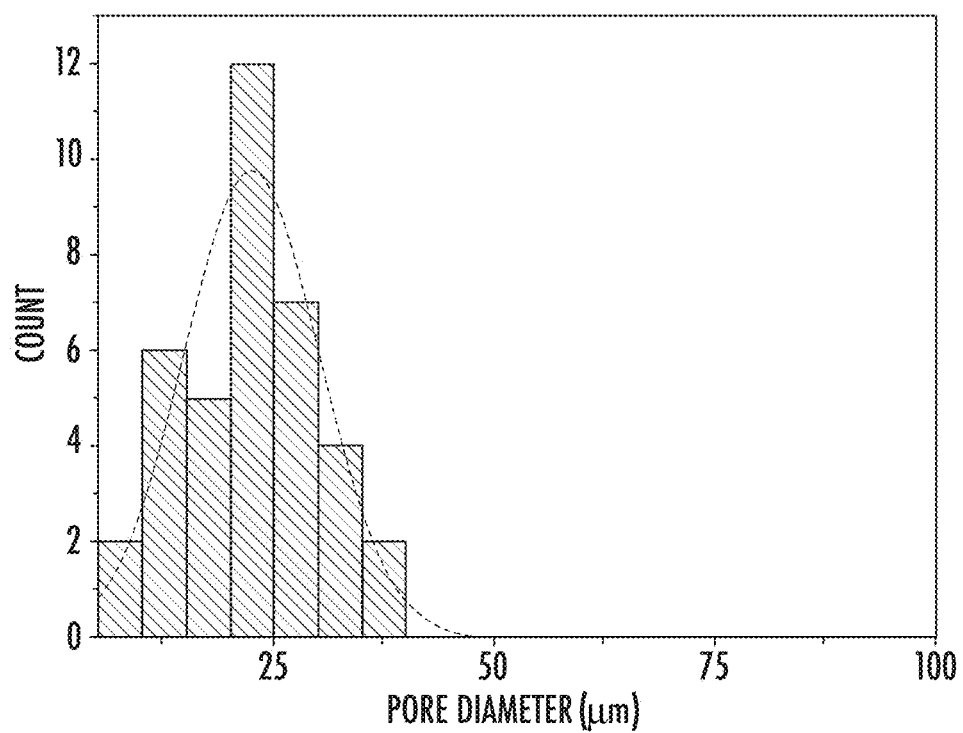
FIG. 5 depicts a histogram of pore size distribution of the TPE foam of FIG. 4.

FIG. 4 provides a picture of the TPE foam. Using the picture of the foam, an analysis of the pore size distribution was performed using the equivalent circle diameter (ECD) methodology, which involves tracing pore outlines within a given area and measuring the diameter of the tracings. FIG. 5 provides a histogram of the pore size distribution. As can be seen in FIG. 5, the pores have an ECD of 100 μm or less. In particular, the pores have an ECD of 50 μm or less. In particular, the pores have an ECD distribution with a peak between 20 μm and 30 μm. In embodiments, the TPE foam has a density reduction (as compared to an unfoamed blend) of at least 60%, more particularly at least 65%.

Figure 6:
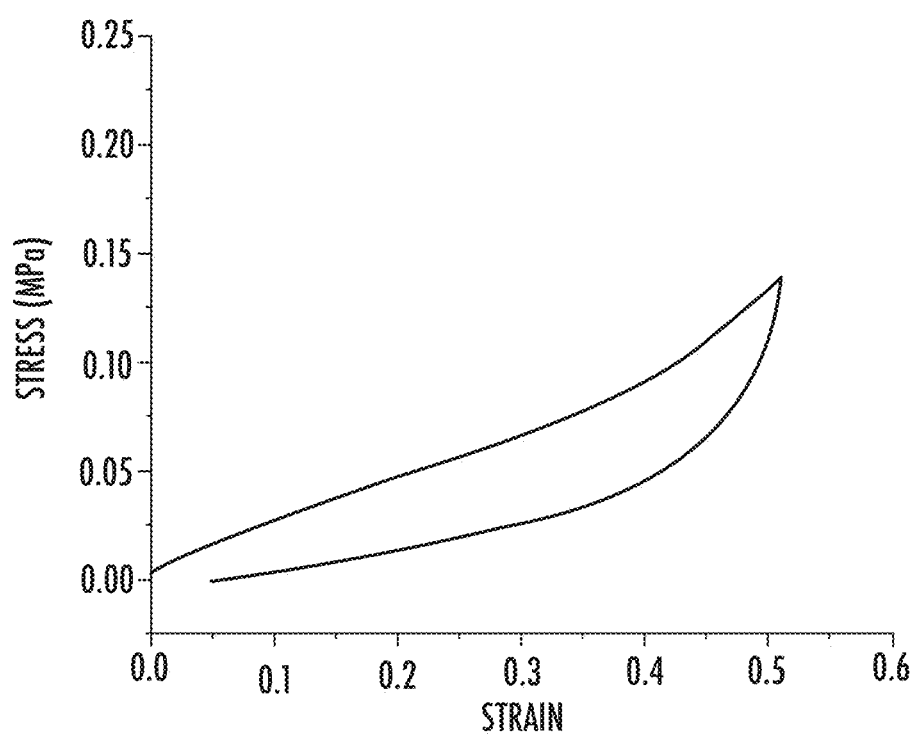
FIG. 6 is a hysteresis graph of compressive stress and strain on a TPE foam according to an embodiment of the present invention and a physically foamed polymer blend according to a comparative example.

The TPE foam specimen of FIG. 4 was tested to determine the compression modulus at 50% strain using a parallel plate compression fixture on an electromechanical tensile test machine (MTS Insight 5 kN) according to ASTM 3574—Standard Test Methods for Flexible Cellular Materials. In particular, the TPE foam specimen was loaded at a constant strain rate of 30% per min until 50% strain was reached. Thereafter, the specimen was unloaded at a constant rate of 30% per minute until the parallel plates returned to their original position. FIG. 6 shows the modulus-strain curve, for the TPE foam. As can be seen in FIG. 6, the TPE foam had a compression modulus of less than 1 MPa at 50% strain. In particular, the TPE foam has a compression modulus of less than 0.25 MPa at 50% strain. Further, the TPE foam returned to a strain of less than 0.1 (e.g., about 0.05) when unloaded.

Figure 7:
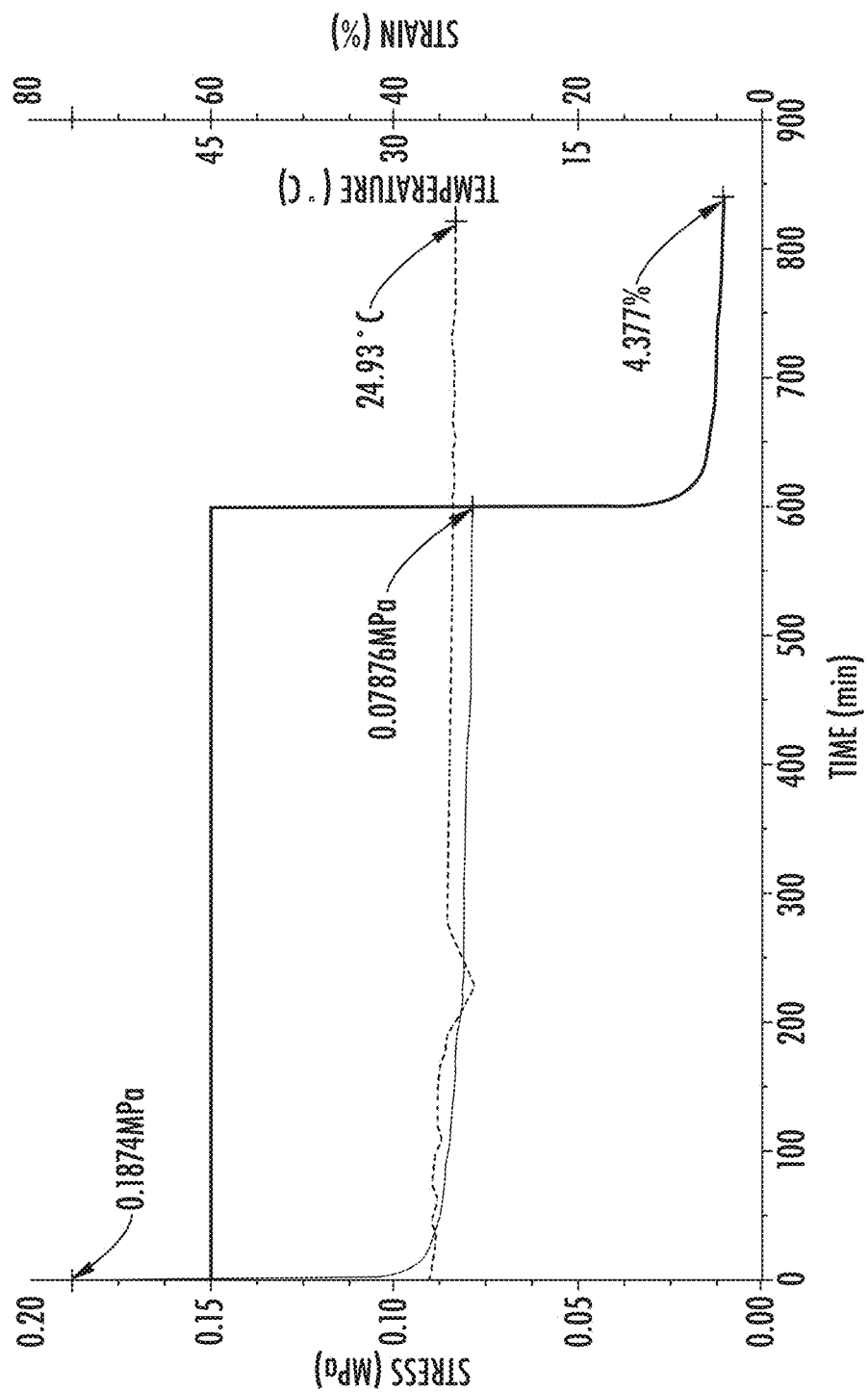
FIG. 7 depicts a graph of stress and strain over time for calculating compression set, according to an exemplary embodiment.

The foam of FIG. 4 was also subjected to compression set testing. Compression set measurement was assessed via a parallel plate compression fixture on a dynamic mechanical analyzer (DMA Q800, available from TA Instruments, New Castle, DE). During testing, the TPE foam specimen was compressed at a constant strain of 60% for 10 hours. The compression load was removed from the foam specimen, and the specimen was monitored for strain relaxation over the next 4 hours. The results of the compression test is shown in FIG. 7. As can be seen in FIG. 7, the specimen only experienced a compression set of less than 5%. That is, after compression at a strain of 60% for 10 hours, the specimen recovered to 95% of its original thickness after strain was removed.

Foams having different compression modulus can be utilized in the same optical fiber cable 10, 10', 10". For example, the optical fiber cable 10, 10', 10" may consist of one or more layers of foams. In one embodiment, the optical fiber cable 10, 10', 10" includes a relatively softer inner layer (i.e., lower modulus), which directly contacts the stranded core or central tube, and a relatively stiffer outer layer, which may contact with cable sheath or armor layer. Such a foam structure allows for further improvement of the cable mechanical performance by absorbing the strain/stress transferred to the core. Specifically, a softer inner layer reduces the compression stress imposed on a stack of optical fiber ribbons during bending and cable coiling. A stiffer outer layer together with the softer inner layer can deform under crushing and impact loading and therefore functions as spacer to reduce the loads. In embodiments, increasing the amount of chemical foaming agent or decreasing the amount of crosslinking agent reduces the compression modulus (e.g., to create the lower modulus inner layer), and decreasing the amount of chemical foaming agent or increasing the amount of crosslinking agent increases the compression modulus (e.g., to create the higher modulus outer layer).

The embodiments of the optical fiber cables 10, 10', 10" disclosed herein are envisioned to pass relevant telecommunications standards for reliability. For example, the malleability and flexibility of the foam allows movement of the ribbon stack subunit during cable coiling at 15× the cable outer diameter (i.e., minimum bend radius) over the temperature range of −30° C. to 70° C. and allows stress dispersion during impact, crush, and other mechanical tests. Further, by replacing free space in the optical fiber cables 10, 10', 10" with foam, the attenuation issue experienced by some conventional cables during the cable crush testing at the corner fibers of the ribbon stack is addressed and attenuation remains below 0.15 dB at all the corner fibers during the 110 N/cm compression load of Telcordia GR-20. Additionally, cable designs incorporating the foam layer have improved mid-span coiling over traditional designs because the foam layer allows for much more robust cable twist performance without attenuation increase. Indeed, according to industry standard GR-20 for twist requirements, a two meter piece of cable must be able to be twisted 180 degree in both directions without having any attenuation greater than 0.15 dB. Embodiments of the disclosed foam allow superior performance in twist testing with three full twists)(1080°) in both directions with attenuation less than 0.15 dB.

Additionally, the foam stays flexible at low temperature. The foam has a brittleness temperature below −50° C. Further, the foam is dimensionally stable over the temperature range of −40° C. to 85° C., and has a shrinkback less than 5%, as required per GR-20 industry standard for jacket components.

The combination of a crosslinking agent with a chemical foaming agent exhibits higher density reduction (>60%) than standard foams made with chemical foaming agents only. The closed cell morphology and the selection of a TPE blend deliver a balance for the TPE foam properties that combines low modulus to provide stress dispersion (and subsequent fiber strain reduction) with >90% thickness recovery after being compressed to 60% of its original thickness. The TPE foam also delivers instantaneous high recovery from large deformations of 50% strain.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A thermoplastic elastomer (TPE) foam, comprising:
   an extruded product of 100 parts by weight of a polymer component comprising at least one TPE, 0.1 to 3 parts by weight of a chemical foaming agent, and 0.1 to 2 parts by weight of a crosslinking agent;
   wherein the TPE foam comprises a closed-cell morphology having pores with an average effective circle diameter of less than 100 μm;
   wherein the TPE foam has a compression modulus of less than 1 MPa at 50% strain as measured according to ASTM 3574; and
   wherein the TPE foam has a compression set of no more than 5% as measured after compression to a strain of 60% for ten hours and after four hours of recovery time using a parallel plate compression fixture on a dynamic mechanical analyzer.

2. The TPE foam of claim 1, wherein the crosslinking agent comprise at least one of dicumyl peroxide, di-tert-butyl peroxide, ditertiary amyl peroxide, tert-butyl peroxide, tert-butyl cumyl peroxide, dibenzoyl peroxide, or tert-butyl hydroperoxide.

3. The TPE foam of claim 1, wherein the chemical foaming agent comprises at least one of azodicarbonamide, azodiisobutyronitrile, benzenesulfohydrazide, 4,4-oxybenzenesulfonyl semicarbazide, para-toluene sulfonyl semicarbazide, barium azodicarboxylate, N,N'-dimethyl-N,N'-dinitrosoterephthalamide, trihydrazino triazine, or sodium bicarbonate.

4. The TPE foam of claim 1, wherein the TPE comprises at least one of a polyolefin elastomer, a thermoplastic polyolefin, or a thermoplastic vulcanizate.

5. The TPE foam of claim 1, wherein the TPE has an unfoamed tensile modulus of at most 10 MPa at 100% secant as measured according ASTM D638.

* * * * *